J. DOTTL.

SPRING AND FRAME SUPPORTER FOR MOTOR CARS.

APPLICATION FILED DEC. 16, 1916.

Reissued June 26, 1917.

14,324.

2 SHEETS—SHEET 1.

Inventor,

Joseph Dottl, By

Pagelsen & Spencer,

Attys.

J. M. Patce

J. DOTTL.

SPRING AND FRAME SUPPORTER FOR MOTOR CARS.

APPLICATION FILED DEC. 16, 1916.

Reissued June 26, 1917.

14,324.

2 SHEETS—SHEET 2.

Witnesses

L. A. Patec.

Inventor

Joseph Dottl,

By

Pagelsen & Spencer,

Attys

UNITED STATES PATENT OFFICE.

JOSEPH DOTTL, OF MADISON, WISCONSIN, ASSIGNOR, BY MESNE ASSIGNMENTS, TO THE DOTTL MANUFACTURING COMPANY, OF MADISON, WISCONSIN, A CORPORATION OF WISCONSIN.

SPRING AND FRAME SUPPORTER FOR MOTOR-CARS.

14,324. Specification of Reissued Letters Patent. Reissued June 26, 1917.

Original No. 1,205,603, dated November 21, 1916, Serial No. 62,601, filed November 20, 1915. Application for reissue filed December 16, 1916. Serial No. 137,453.

*To all whom it may concern:*

Be it known that I, JOSEPH DOTTL, a citizen of the United States, and a resident of Madison, in the county of Dane and State of Wisconsin, have invented a new and useful Spring and Frame Supporter for Motor-Cars, of which the following is a specification.

This invention relates to auxiliary springs for vehicles, being especially designed as a reinforcing support for the main body supporting spring or springs of a vehicle and being applicable to certain types of vehicles already in use, the device being adapted to be readily applied to vehicles and requiring no material change in the structure of the vehicle itself.

The object of the present invention is to support the weak points of a main vehicle spring so as to materially increase the carrying capacity and strength of the entire spring, preventing the frame of the vehicle from bending downwardly and shearing off the center bolt and also from shifting sidewise. The device enables the load of the vehicle to be practically doubled, prevents the main spring or springs from riding or resting on the axle housing, prevents the loaded body from swaying laterally, maintaining the same in a substantially upright position, and also avoiding the objectionable tipping up of the front end of the body. Incidentally the device relieves the tires and the entire car by preventing lateral or side-swinging motion of the body especially when turning corners and traveling over rough roads. The device enables the chassis of a pleasure car to be converted into a truck for carrying a load much greater than the springs were originally designed for.

With the above and other objects in view, the invention consists in the novel construction, combination and arrangement of parts, as herein described, illustrated and claimed.

Figure 1:
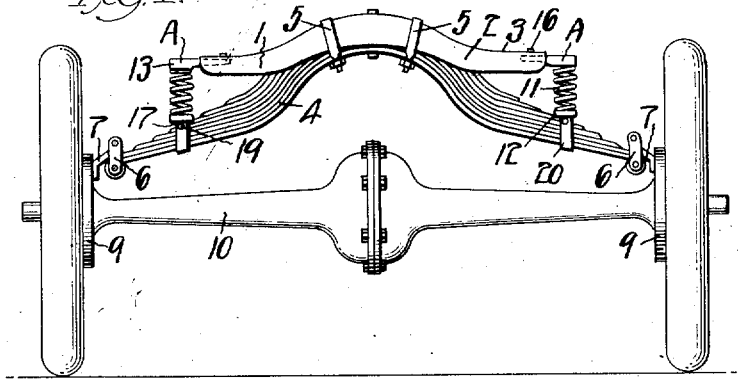
Figure 2:
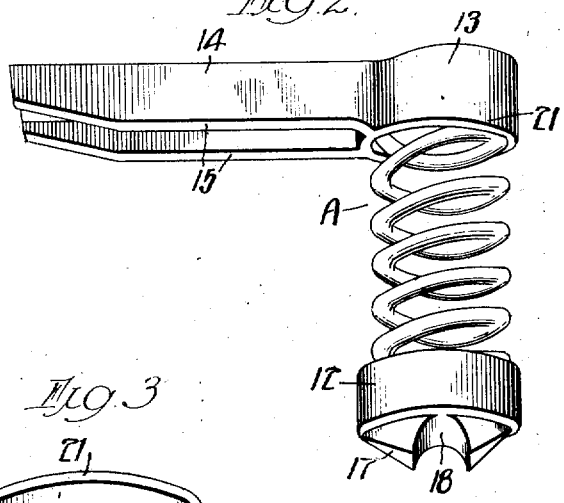
Figure 5:
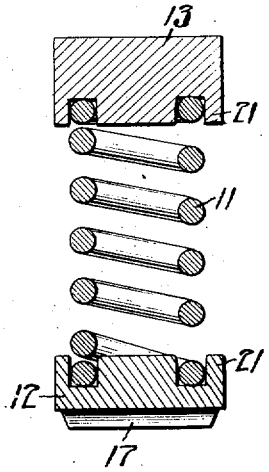
Figure 3:
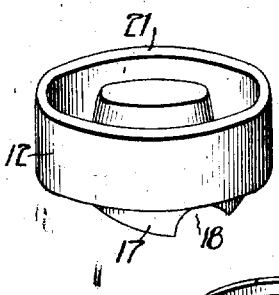
Figure 4:
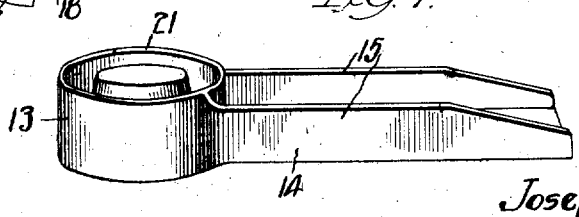
Figure 6:
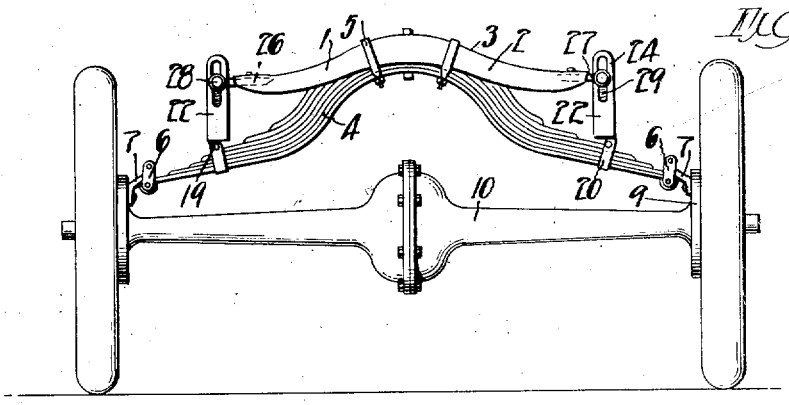
Figure 7:
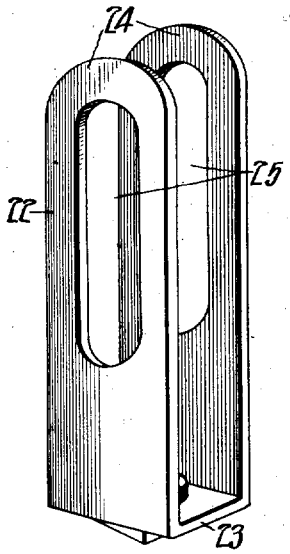
Figure 10:
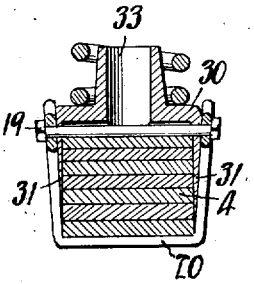
Figure 9:
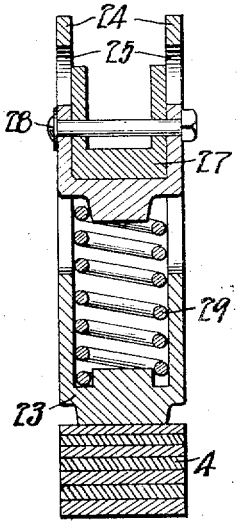
Figure 11:
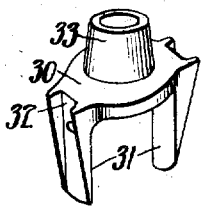
Figure 8:
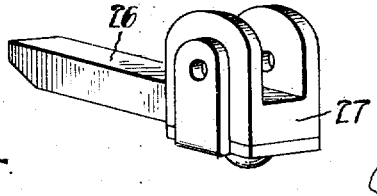

In the accompanying drawings, Figure 1 is a rear elevation of sufficient part of an automobile to illustrate the application of the present invention thereto, the auxiliary spring being shown in the preferred form thereof. Fig. 2 is an enlarged perspective view of one of the auxiliary body supporting units. Fig. 3 is a detail perspective view of the bottom spring holder or cap. Fig. 4 is a similar view of the upper cap with the bolster extension arm. Fig. 5 is a vertical section through the top and bottom spring-holding caps, showing the relation of the ends of the spring thereto. Fig. 6 is a rear elevation similar to Fig. 1 showing another form of auxiliary body-supporting unit. Fig. 7 is a detail perspective view of the support for the lower end of the auxiliary spring. Fig. 8 is a similar view of the upper spring-holding cap with its arm forming the bolster extension. Fig. 9 is a vertical longitudinal section through the auxiliary unit shown in Fig. 6. Fig. 10 is a fragmentary vertical section of a modification showing means for fastening the bottom holder or cap to the spring. Fig. 11 is a detail perspective view of the holder or cap shown in Fig. 10.

Referring to the drawings 1 designates a vehicle body bolster which extends transversely of the body and is usually formed of channel iron, being provided with the longitudinal flanges 2 which extend downwardly from the top plate or main body 3 of the bolster.

4 designates one of the main body-supporting springs which is shown as of the multiple leaf type and centrally arched and fitted between the flanges 2 of the bolster to which it is secured by means of clips 5. The extremities of the spring 4 are usually connected by swinging shackles 6 to arms 7 fastened to the expanded end portions 9 of the rear axle housing 10.

All of the parts hereinabove described are of the ordinary construction and arrangement.

In carrying out the present invention in the simpler form thereof, I employ a pair of auxiliary body supporting units designated at A, A. Each body-supporting unit comprises a coiled expansion spring 11, a holder or cap 12 for the bottom end of the spring 11 and a top cap or holder 13 for the spring 11, said cap 13 being formed with an arm 14 preferably formed integrally with the holder or cap 13 and extending substantially at a right angle to the axis of the spring 11 as clearly indicated in the drawings. The arm 14 is preferably channeled on its under side to provide the downwardly extending longitudinal flanges 15 while the top wall of the arm 14 is provided with a bolt hole to receive a bolt 16 by means of which the arm 14 is securely fastened to the adjacent end of the bolster 1, the flanges 15 being arranged so as to enable them to be introduced between the flanges 2 of the bolster 1 and thus rendering it unnecessary to use more than a single bolt 16 to secure the arm of the bolster. The arm 14 thus constitutes an extension of one end of the bolster 1.

The bottom support or holder 12 is provided on its under side with a lug 17 having a convex lower face and centrally formed with a groove 18 designed to fit over and upon the bolt 19 of a clip 20 which embraces and holds together the leaves of the main body supporting spring 4. Owing to the fact that the spring 11 is always partly compressed, it is not ordinarily necessary to additionally fasten the supporting holder 12 to the clip 20 or the spring 4. The holders or caps 12 and 13 are provided in their adjacent faces with annular grooves or seats 21 for the terminal convolutions of the coiled expansion spring 11, thus preventing the spring from flying out of place.

In another embodiment of the invention as shown in Figs. 6 to 9 inclusive, the holder 22 for the bottom end of the spring 11 is shown as composed of a metal strap which is bent to form a bottom connecting portion 23 and parallel upwardly extending arms 24 which are formed with slots 25 extending lengthwise thereof and substantially in a vertical direction when the unit is in place. The upper spring holder or cap 26 is provided with the arm 27 corresponding with the bolster extension arm 14 of the preceding figures of the drawings and a guiding member 28 shown in the form of a pin or bolt is inserted through the cap 26 and works longitudinally of the slots 25 under the action of the spring 29 and the weight imposed thereon. The arm 27 of the upper cap or holder is fastened to the bolster 1 in the same manner as hereinabove described and the bottom of the unit rests upon and is held in place by the bolt 19 of the spring clip 20 as indicated in Fig. 6.

From the foregoing description taken in connection with the accompanying drawings it will now be understood that the auxiliary body supporting units are practically interposed between the extremities of the body supporting bolster and the adjacent main body supporting spring of the vehicle. All of the load is therefore not imposed on the center of the spring 4 but a substantial portion of the load is also supported by the spring at the points where the auxiliary units are employed. This not only distributes the load along the main body supporting spring but prevents lateral tilting of the body and therefore the tendency of the machine and the load to sway laterally, especially in making short turns and in traveling over rough roads. A much greater load may be carried by the vehicle on account of the auxiliary body-supporting units and the latter may be quickly and easily associated with the vehicle by merely jacking up the bolster 1 and thereby relieving the weight on the spring 4 so that the auxiliary body-supporting units may be placed in their useful positions.

In Figs. 10 and 11 the bottom holder or cap 30 is shown as provided with downwardly extending arms 31 which embrace the spring 4, the arms 31 being channeled at 32 to receive the arms of the clip 20 which embraces the vehicle spring. Said cap or holder 30 is provided with the upstanding boss 33 to receive and hold in place the bottom portion of the spring 11. The arms 31 are provided with holes in line with the holes of the clip 20 to receive the clip retaining bolt. The arms 31 are also preferably tapered or made of gradually decreasing thickness toward their lower extremities so as to wedge themselves firmly between the opposite faces of the spring 4 and the inner faces of the upwardly extending side portions of the clip 20.

Having thus described my invention, I claim:—

1. The combination with a vehicle frame, a bolster extending transversely thereof and having parallel longitudinal flanges extending downwardly therefrom, and an arched body-supporting main spring centrally secured to the bolster and terminally connected with the axle housing, of auxiliary body-supporting units interposed between the bolster ends and said spring, each unit comprising a coiled expansion spring, a holder for the bottom end of said expansion spring supported upon the main spring, and a bolster extension arm fastened to the underside of the bolster between the flanges thereof and embodying a spring holding cap which fits over the upper end of said expansion spring.

2. A motor vehicle including an axle housing having an enlarged central portion, a bolster extending longitudinally of and substantially above said axle housing, an arched bolster-supporting main spring centrally secured rigidly to the bolster and terminally connected with the axle housing, said spring being capable of transmitting from its central portion to its end portion substantially all stresses caused by the tendency of the bolster to shift bodily laterally of the vehicle, and a pair of auxiliary springs interposed between the end portions of said bolster and the main spring whereby the main spring is prevented from riding on the enlarged central portion of the axle housing under heavy loads.

3. A motor vehicle comprising an axle housing, a bolster extending longitudinally of and substantially above said housing, a bolster supporting main spring centrally secured rigidly to the bolster and terminally connected with the axle housing, said spring being capable of transmitting from its central portion to its end portions substantially all stresses caused by the tendency of the bolster to sway transversely of the vehicle, and additional compression springs supported from below and having substantially vertical axes, said springs being arranged to receive a portion of the vertical load from the corresponding end portions of the bolster, whereby the amount of load transmitted from the central portion of the bolster to the spring is reduced.

4. A motor vehicle including a pair of wheels, a bolster arranged between said wheels, a bolster-supporting main spring centrally secured rigidly to the bolster through which the weight on the bolster passes on its way to the wheels, said spring being capable of transmitting from its central portion to its end portion substantially all stresses caused by the tendency of the bolster to shift bodily laterally of the vehicle, and auxiliary springs having substantially vertical axes interposed between the end portions of the bolster and the end portions of the main spring.

5. A motor vehicle comprising a pair of wheels, a bolster arranged between said wheels, means for transmitting the load on the bolster to the wheels, said means including a bolster supporting main spring centrally secured rigidly to the bolster, said spring being capable of transmitting from its central portion to its end portions substantially all stresses caused by the tendency of the bolster to sway transversely of the vehicle, and additional compression springs supported from below and having substantially vertical axes located outwardly beyond the corresponding end of the bolster, and means for operatively connecting the upper end portions of the spring to the corresponding end portions of the bolster, so constructed and arranged that the tendency of the bolster to tilt on the main spring is largely overcome and the amount of vertical load transmitted from the central portion of the bolster to the spring is reduced.

6. In combination, a pair of wheels, a bolster arranged between said wheels, means for transmitting the load on the bolster to the wheels, said means including an arched bolster supporting leaf spring centrally secured to the bolster and having clips whereby the end portions of the leaves are held in proper relative alinement, said means also including auxiliary springs operatively connected to the end portions of the bolster and to the corresponding clip.

7. A motor vehicle including an axle housing provided with an enlarged central portion, a bolster extending longitudinally of and substantially above said axle housing, an arched bolster-supporting leaf spring centrally secured rigidly to the bolster and terminally connected with the axle housing, said spring lying substantially in the central vertical plane through the axis of the axle housing and being of a strength sufficient to transmit side sway of the body, a pair of auxiliary springs interposed between the end portions of said bolster and the main spring whereby the main spring is prevented from riding on said enlarged central portion of the axle housing under heavy loads.

8. A motor vehicle including a pair of wheels, a body supporting bolster arranged between the wheels and substantially in the vertical plane through the common axes of said wheels, means for transmitting the load on the body to the wheels, said means including a bolster-supporting arched main spring centrally secured rigidly to the bolster, said means also including coil compression springs supported from below and having substantially vertical axes located outwardly beyond the corresponding end of the bolster, and substantially in the vertical plane which includes the common axis of the wheels and means constructed and arranged to transmit body loads to the tops of said coil springs.

9. The combination with a vehicle frame, a bolster extending transversely thereof, and an arched body-supporting leaf spring centrally secured to the bolster and terminally connected with the axle housing, of auxiliary body-supporting units interposed between the bolster ends and said spring, each unit including a coiled compression spring, and a holder for the lower end of said spring, said holder including downwardly extending arms which embrace the sides of the leaf spring.

10. The combination with a vehicle frame, a bolster extending transversely thereof, and an arched body-supporting leaf spring centrally secured to the bolster and terminally connected with the axle housing, of detachable auxiliary body-supporting units interposed between the bolster ends and said spring, said units projecting laterally beyond the ends of said bolster, each unit including a coiled compression spring.

11. A motor vehicle including an axle housing, a bolster extending longitudinally of and substantially above said housing, a bolster-supporting main spring centrally secured to the bolster and terminally connected with the axle housing, and additional compression springs supported from below and associated with the end portions of said bolster whereon an appreciable portion of the vertical load on said bolster is carried, said additional springs being detachable from said bolster and being located outwardly beyond the corresponding ends thereof.

12. A motor vehicle including a pair of wheels, a bolster arranged between the wheels and substantially above the common axis of the wheels, means for transmitting the load on the bolster to the wheels, said means including an arched terminally supported main spring centrally secured rigidly to the bolster, and means associated with the corresponding end portions of the bolster and the spring whereby a part of the load is transmitted to the main spring at points considerably removed from the point at which said spring is secured to the bolster, said last mentioned means including resilient elements located outwardly beyond the corresponding end portion of the bolster.

13. In combination, an axle construction, shackles pivotally supported on said axle construction, an arched main spring pivotally supported by said shackles and extending longitudinally of said axle construction substantially in the central vertical plane lengthwise of the construction, load receiving means rigidly connected to the central portion of the main spring, said main spring being adapted to transmit substantially all stresses due to the tendency of the body to shift bodily laterally, and additional means, including resilient compression members supported from below and having substantially vertical axes located substantially in the central vertical plane lengthwise of the axle construction, so constructed and arranged that a portion of the load passes through it on its way to the axle construction without passing through the connection between the load receiving means and the central portion of the main spring.

14. A motor vehicle including an axle housing, a bolster extending longitudinally of and substantially above said housing, arms fixed to the end portions of said housing, shackles pivoted directly to said arms and depending therefrom, an arched main spring pivoted directly to said shackles, a bolster centrally secured to said main spring and extending longitudinally thereof, additional compression springs supported from below and having substantially vertical axes, and means for connecting the upper ends of said compression springs to the end portions of the bolster so constructed and arranged that deflection of the main spring is lessened.

JOSEPH DOTTL.